US006217964B1

(12) United States Patent
Ndebi et al.

(10) Patent No.: US 6,217,964 B1
(45) **Date of Patent: *Apr. 17, 2001**

(54) ENDLESS BELT FOR USE IN DIGITAL IMAGING SYSTEMS AND METHOD OF MAKING

(75) Inventors: Sylvain L. Ndebi, Asheville; William Haul Haddock, Candler; Allen T. Shannon, Waynesville, all of NC (US)

(73) Assignee: Day International, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/256,794

(22) Filed: Feb. 24, 1999

(51) Int. Cl.[7] .................................................... B29D 22/00
(52) U.S. Cl. .................... 428/36.91; 428/36.1; 428/36.2; 428/35.2; 442/286; 442/289; 442/394; 442/396; 442/397; 427/145; 382/276; 156/135; 156/184
(58) Field of Search ............................ 382/276; 427/145; 442/286, 289, 394, 396, 397; 428/36.1, 36.2, 35.2, 36.91; 156/135, 184

(56) References Cited

U.S. PATENT DOCUMENTS 1,804,139 5/1931 Adsit et al. .
4,009,957 3/1977 Suzuki et al. .
4,747,992 * 5/1988 Sypula et al. ........................ 264/130
4,788,572 11/1988 Slayton et al. .
5,079,121 1/1992 Facci et al. .
5,128,091 7/1992 Agur et al. .
5,240,531 * 8/1993 Toda et al. ........................... 156/137
5,258,154 11/1993 Okuyama et al. .
5,296,276 * 3/1994 Maruyama et al. ................ 428/35.7
5,298,956 * 3/1994 Mammino et al. .................. 355/275
5,308,725 5/1994 Yu et al. .
5,413,810 5/1995 Mastalski .
5,532,056 * 7/1996 Satoh et al. .......................... 428/332
5,709,765 * 1/1998 Herbert et al. ........................ 156/293
5,798,181 8/1998 Hobson et al. .
5,832,351 * 11/1998 Takekoshi et al. ................. 399/303
5,899,610 5/1999 Enomoto et al. .

FOREIGN PATENT DOCUMENTS 0 769 729 4/1997 (EP) .
784244A2 * 7/1997 (EP) .............................. G03G/15/16
9-190090 7/1997 (JP) .
10-111613 4/1998 (JP) .

* cited by examiner

*Primary Examiner*—Blaine Copenheaver
*Assistant Examiner*—Arti R. Singh
(74) *Attorney, Agent, or Firm*—Kilworth, Gottman, Hagan & Schaeff, L.L.P.

(57) ABSTRACT

An endless belt for use in digital imaging systems is provided having uniform edge to edge flatness, and precise circumferential and edge to edge thickness. The layers comprising the belt may be tailored as desired for use in either latent image formation, image transfer or sheet transport operations. In one embodiment, the belt includes an elastomeric base layer, an intermediate polymer ply over the base layer, and an outer elastomeric layer. Alternatively, the belt includes an elastomeric base layer and an outer polymer layer. The belt may further include reinforcing layers which may comprise a woven or non-woven fabric layer and/or an elastomerimpregnated spun cord layer. The belt is preferably manufactured by building the layers on a workpiece and then curing the layers.

17 Claims, 3 Drawing Sheets

ENDLESS BELT FOR USE IN DIGITAL IMAGING SYSTEMS AND METHOD OF MAKING

BACKGROUND OF THE INVENTION

The present invention is directed to an endless belt and method of making it for use in digital imaging systems, and more particularly, to such a seamless, reinforced belt which may be used in intermediate image transfer, toner fusing or transfusing, and/or sheet transport operations.

Digital imaging systems are widely used in the field of xerography and electrography where dry or liquid toner is used to print text and graphic images. For example, systems which use digitally addressable writing heads to form latent images include laser, light-emitting diode, and electron beam printers. Copiers use optical means to form latent images. Regardless of how they are formed, the latent images are inked (or toned), transferred and fixed to a paper or polymer substrate. Such imaging systems typically include a component such as an endless belt, roll or drum which is utilized for latent image recording, intermediate image transfer (transfer of a toner image to the belt followed by transfer to a substrate), transfusing of toner (transport of the unfused image onto the belt with subsequent fusing), contact fusing, or electrostatic and/or frictional transport of imaging substrates such as paper, transparencies, etc.

In the case of endless belts, such belts are typically moved or driven under appropriate traction and tension by rotating cylindrical rollers. As such belts play a critical role in the imaging or substrate transport process, they must be engineered to meet exacting standards. For example, image transfer belts must be seamless, flexible, and must exhibit uniform flatness. Further, the belts should provide certain electrical properties (dielectric constant, volume and surface resistivity, etc.) chemical properties (resistance to humidity, UV light, etc.) and dimensional specifications (circumference, thickness, width, etc.) which may vary depending on the desired application.

Accordingly, there is a need in the art for an endless belt for use in digital imaging systems which can be manufactured and operated to be within exacting tolerances, including surface flatness, and which may be used for a wide variety of imaging, image transfer or sheet transport operations.

SUMMARY OF THE INVENTION

The present invention meets that need by providing an endless belt having precise and uniform flatness which also possesses a working surface which can be tailored to provide the proper characteristics for image recording, image transfer or sheet transport.

In accordance with one aspect of the present invention, an endless belt for use in a digital imaging system is provided which has first and second edges and a plurality of plies. By uniform flatness, it is meant that the thickness of the belt varies less than 0.001 inches (0.003 cm) from the first edge to the second edge and also from one circumferential point (location) to another. The circumferential uniformity of the belt also varies less than 0.005 inches (0.013 cm) in conicity to provide circumferential uniformity over the entire belt structure.

In a preferred embodiment of the invention, the belt comprises an elastomeric base ply, an intermediate polymer ply on the base ply, and an outer elastomeric ply on the intermediate ply. It should be understood that for purposes of the present invention, the term "on" when referring to the position of the plies means that one ply is adjacent to and in contact with the ply that it is "on". Further, it should be understood that for purposes of the present invention, the terms "ply" and "layer" are interchangeable.

The outer ply functions as a working surface layer which is adapted to accept an imaging composition or to transport a substrate. For example, the surface layer may be used as a latent image recording surface; as an intermediate image transfer surface which accepts a toned and unfused image from a latent image recording component; as a dielectric surface which accepts electrostatic charges for attracting, holding in register, and transporting paper or transparency substrates; or as a toner fusing surface which can press and fix (or fuse) toner to a substrate.

The outer ply preferably comprises an elastomer selected from the group consisting of silicone, fluorosilicone, fluorocarbon, EPDM (ethylene-propylene diene terpolymers), EPM (ethylene-propylene copolymers), polyurethane elastomers, and blends thereof In one embodiment of the invention, the outer ply is electrically conductive. By electrically conductive, it is meant that the ply has a resistivity of less than about $10^{14}$ ohm·cm. The outer ply preferably has a surface resistivity of less than about $10^{14}$ ohm/square, which is desirable for intermediate image transfer, toner fusing or transfusing applications. In applications as latent image recording or substrate transport in which a surface charge density is applied to the outer or working surface layer, the outer elastomeric ply preferably has a volume resistivity of about $10^{12}$ ohm·cm or greater.

In another embodiment of the invention, the outer ply is electrically insulative. By electrically insulative, it is meant that the ply has a volume resistivity of higher than about $10^{14}$ ohm·cm. The surface resistivity of the outer ply is about $10^{14}$ ohm/square or higher, which is desirable for electrostatic applications which involve gripless substrate transport over the belt surface.

The intermediate polymer ply preferably comprises a polymer selected from the group consisting of polytetrafluoroethylene, polyetherimide, polyvinylidene fluoride, and ethylene-chlorotrifluoroethylene. The intermediate ply is preferably etched on both surfaces so as to achieve good adhesion with the surrounding elastomeric plies.

The elastomeric base ply is preferably selected from the group consisting of silicone, fluorosilicone, fluorocarbon, EPDM (ethylene-propylene diene terpolymers), EPM (ethylene-propylene copolymers), polyurethane elastomers, and blends thereof.

In the above embodiment, for greater circumferential strength, an elastomer-impregnated spun cord layer may be included between the base ply and the intermediate ply to provide additional support to the belt. By "cord", we mean either a single fiber or multiple fibers formed into a continuous cord. By "impregnated", we mean that the elastomer at least partially occupies spaces between the spun fiber or fibers but does not necessarily impregnate individual fibers. The elastomer preferably comprises any of the elastomers listed above. Alternatively, the belt may include both an elastomer-impregnated spun cord layer and a woven or non-woven fabric ply on the spun cord layer. The fabric ply is also preferably impregnated with any of the above elastomers.

In an alternative embodiment of the invention, the belt comprises an outer polymer layer and an elastomeric base ply. In this embodiment, the outer polymer layer is preferably selected from the group consisting of polytetrafluoroethylene, polyetherimide, polyvinylidene fluoride, and ethylene-chlorotrifluoroethylene. The outer layer is preferably etched on the surface contacting base ply to achieve good adhesion with the base ply. The base ply is preferably selected from the group consisting of silicone, fluorosilicone, fluorocarbon, EPDM, and blends thereof In this embodiment, the belt may optionally include an elastomer-impregnated spun cord layer on the base layer and/or a woven or non-woven fabric ply on the spun cord layer as described above.

The present invention also provides a method of making the endless belt for use in a digital imaging system. In one embodiment, the method generally comprises the steps of applying an uncured elastomer to a workpiece such as a mandrel to form a base layer, applying an intermediate polymer layer over the base layer, applying an outer layer of an uncured elastomer over the intermediate polymer layer, and then curing the assembled layers.

The method preferably includes the step of etching both sides of the intermediate polymer layer prior to its application over the base layer.

The method may include the step of applying an elastomer-impregnated spun cord layer on the base layer prior to the application of the intermediate polymer layer and, alternatively, the method may include the step of applying both an elastomer-impregnated spun cord layer on the base layer and a woven or nonwoven fabric layer over the spun cord layer.

The elastomeric base layer is preferably coated onto the surface of the workpiece in the form of a solvated rubber solution. The outer elastomeric layer may also be coated in this manner over the intermediate polymer layer, or alternatively, it may be applied in the form of a calendered sheet of uncured elastomer over the intermediate polymer layer.

After the outer elastomeric layer is applied, the assembled layers are then cured. After curing, the surface of the outer elastomeric layer is preferably ground or otherwise treated such that the elastomeric layer functions as a working surface layer as described above.

Endless belts formed by the methods of the present invention have been found to exhibit excellent performance when installed under tension in digital imaging machines. Based on the construction and choice of elastomer or polymers, the belts have also been found to exhibit adequate toner acceptance properties for use in intermediate image transfer, adequate retention of surface charge density for substrate transport applications, toner fusing, or transfusing applications.

Accordingly it is a feature of the present invention to provide a seamless belt for use in digital imaging machines which exhibits uniform flatness, and which can be used for latent image recording, image transfer or sheet transport. These, and other features and advantages of the present invention will become apparent from the following detailed description, the accompanying drawings, and the appended claims.

DETAILED DESCRIPTION OF THE PREFERRED EMBODIMENT

The seamless belt of the present invention provides an advantage over prior art belts in that it may be manufactured within exacting tolerances to obtain flatness uniformity and superior performance under rotational tension. In addition, the plies may be varied for specific applications such that the belt can be tailored for use in latent image recording, intermediate image transfer, substrate transport, and toner fusing or toner tranfusing.

For example, in substrate transport applications in which a surface charge density is applied over the outer layer, the outer ply preferably comprises a plastic film, and the entire endless belt has a back to face bulk resistivity of about $10^{14}$ ohm·cm or higher.

For intermediate image transfer, the outer layer preferably comprises an elastomer that is capable of releasing toner and has a surface resistivity of about $10^{14}$ ohm/square or lower.

For toner fusing, all of the layers in the belt are comprised of high temperature resistant and thermal transfer efficient materials, and the outer layer is preferably elastomeric.

For transfusing applications, the outer layer is preferably comprised of a high temperature resistant elastomer that has adequate toner release properties and a surface conductivity of about $10^{14}$ ohm/square or lower. It should be appreciated that the composition and properties of the layers comprising the belt may be varied as desired depending on the desired end use for the belt.

Figure 1:
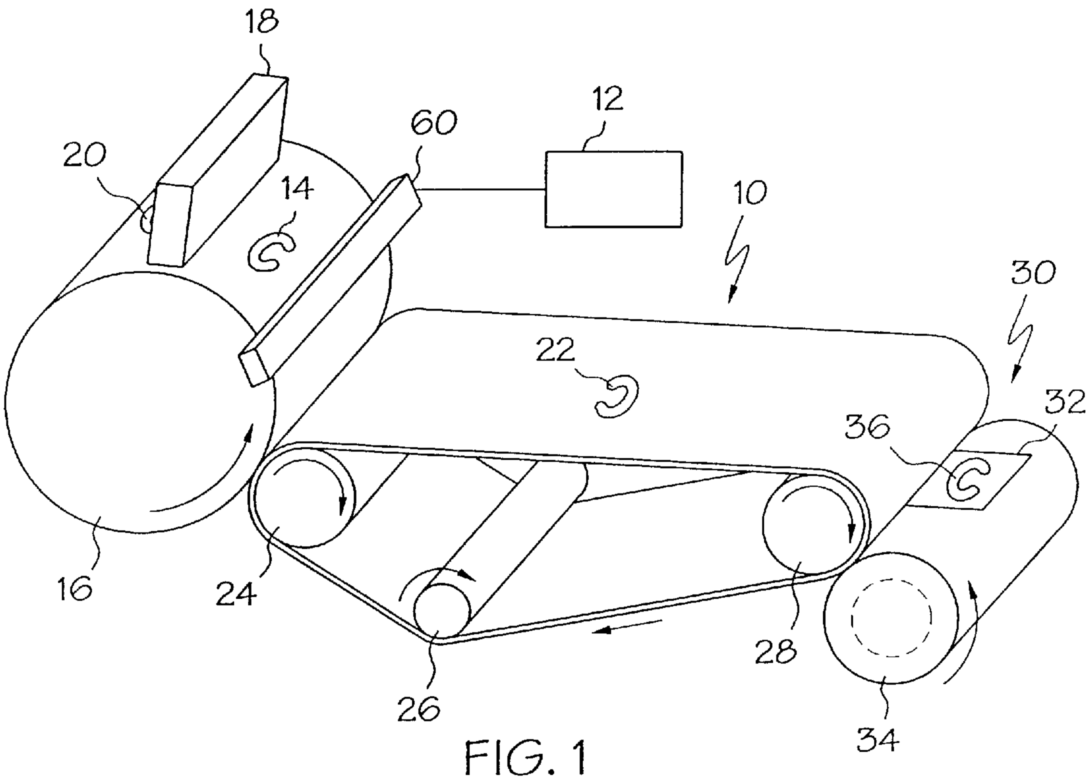
FIG. 1 is a perspective view of the belt of the present invention mounted on rotational rollers.
Figure 2:
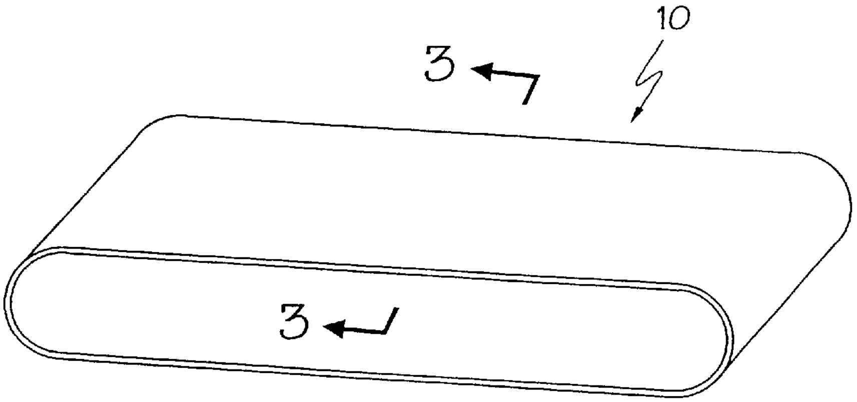
FIG. 2 is a perspective view of the belt of FIG. 1.

Referring now to FIGS. 1 and 2, a belt 10 made according to the present invention is illustrated which has a seamless, uniformly flat structure. In the embodiment in FIG. 1, the belt 10 as shown is used for intermediate image transfer. In another application, the belt may also be used as a recording medium such as the recording drum 16 illustrated in FIG. 1.

Initially, a computer 12 controls the formation of a latent image 14 via a writing head 60 (such as a laser or LED) onto a recording drum 16. The latent image electrostatically attracts dry toner from a toner cartridge 18 to form a toned, unfused image 20. This image is then transferred to the belt 10 in the form of an intermediate image 22. The belt is driven by rollers 24, 26 and 28 which advance the intermediate image through a transfusing nip 30 where heat and pressure are applied to simultaneously transfer and fuse the toner image onto a substrate 32 which is synchronously advanced by fusing roller 34 to form the final, fused image 36. It should be appreciated that latent image 14, unfused image 20, intermediate image 22 and fused image 36 are shown in such a way as to better illustrate the sequence of steps involved in forming an image. For example, in the actual process, transfer and fusing of image 36 onto substrate 32 occurs at nip 30. It should also be appreciated that the above-described process can be adapted to liquid toner.

Figure 3:
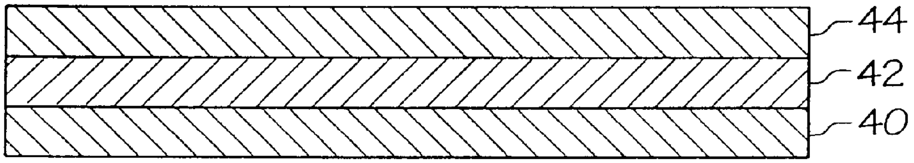
FIG. 3 is a sectional view taken along lines 3—3 of FIG. 2.

FIG. 3 illustrates the endless belt made according to one embodiment of the present invention. The belt 10 includes an elastomeric base ply 40, an intermediate polymer ply 42, and an outer elastomeric ply 44. Both the outer and base plies are preferably elastomeric and may be comprised of silicone, fluorosilicone, fluorocarbon, EPDM, EPM, and polyurethane elastomers, or blends thereof A preferred elastomer for use in the present invention is a silicone rubber such as polydimethyl siloxane or methylvinyl siloxane based rubber mixed with other ingredients according to desired specifications. The outer ply 44 may be electrically conductive or insulative, depending on the desired application of the belt. Where a conductive elastomeric ply is desirable, elastomer preferably contains a sufficient amount of carbon black or other conductive additives to give the outer ply a surface resistivity of about $10^{14}$ ohm/square or less.

The intermediate polymer ply 42 is preferably selected from the group consisting of polytetrafluoroethylene, polyetherimide, polyvinylidene fluoride, and ethylene-chlorotrifluoroethylene. However, it should be appreciated that any other polymeric materials may be used as long as they provide the desired dielectric properties. For example, materials are preferred which have a high resistivity of from about $10^{14}$ ohm/square or higher, which allows the resulting belt to function as a capacitor, where intermediate ply 42 functions as a dielectric layer. The intermediate ply is preferably etched on both sides which contact the base and outer elastomeric plies so as to promote good adhesion onto the elastomeric plies. The ply may be etched by conventional chemical or mechanical methods, or combinations thereof. The preferred thickness of the intermediate ply is about 0.007 inches or less.

It should be appreciated that the intermediate ply provides sufficient strength to the belt so that additional reinforcement layers are not necessarily needed. However, in some embodiments it may be desirable to include additional reinforcement support layers.

Figure 4:
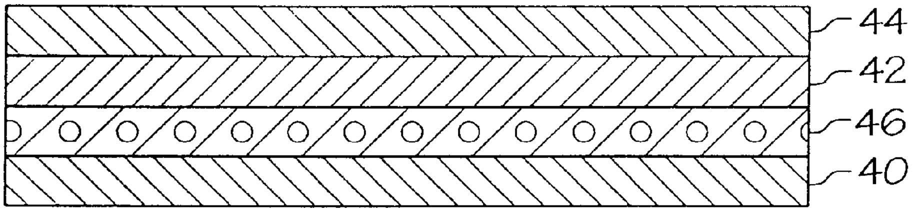
FIG. 4 is a sectional view of another embodiment of the invention.

For example, in an alternative embodiment of the invention illustrated in FIG. 4, the belt further includes an elastomeric-impregnated spun cord layer 46, which provides circumferential stability and strength to the belt. The elastomeric-impregnated spun cord layer is preferably formed using fabric, plastic, or metal cord or fiber such as polyaramid, fiberglass or stainless steel which has been dipped in a solution of an elastomer in a solvent and wrapped or spun around a mandrel as will be explained in greater detail below.

Figure 5:
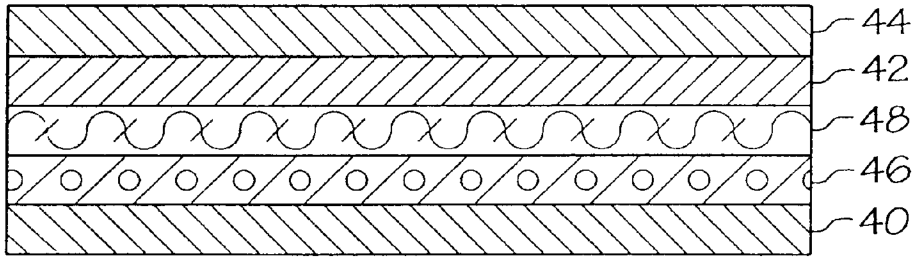
FIG. 5 is a sectional view of another embodiment of the invention.

In another alternative embodiment shown in FIG. 5, the belt may comprise a base elastomeric ply 40, an elastomer-impregnated spun cord layer 46, a woven or nonwoven fabric layer 48, intermediate polymer ply 42, and outer elastomeric (surface) ply 44. The fabric ply 48 provides transverse strength to the belt and may comprise high temperature resistant aramid fibers. The fabric is preferably impregnated with an elastomer as will be described below.

Figure 6:
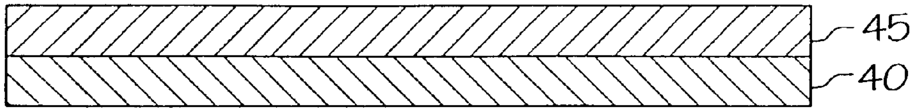
FIG. 6 is a sectional view of another embodiment of the invention.

In another embodiment of the invention illustrated in FIG. 6, the seamless belt comprises only an outer polymer layer 45 and an elastomeric base ply 40. Ply 45 preferably comprises a endless plastic film such as polytetrafluoroethylene, polyetherimide, polyvinylidene fluoride, or ethylene-chlorotrifluoroethylene which provides sufficient strength to the belt such that no reinforcement layers are necessary. However, it should be appreciated that reinforcement layers such as a spun cord layer and/or a woven or nonwoven fabric layer as described above may be included between the outer and base plies if desired. Outer ply 45 is preferably etched on the surface contacting the base ply 40 so as to better adhere to the base ply.

Figure 7:
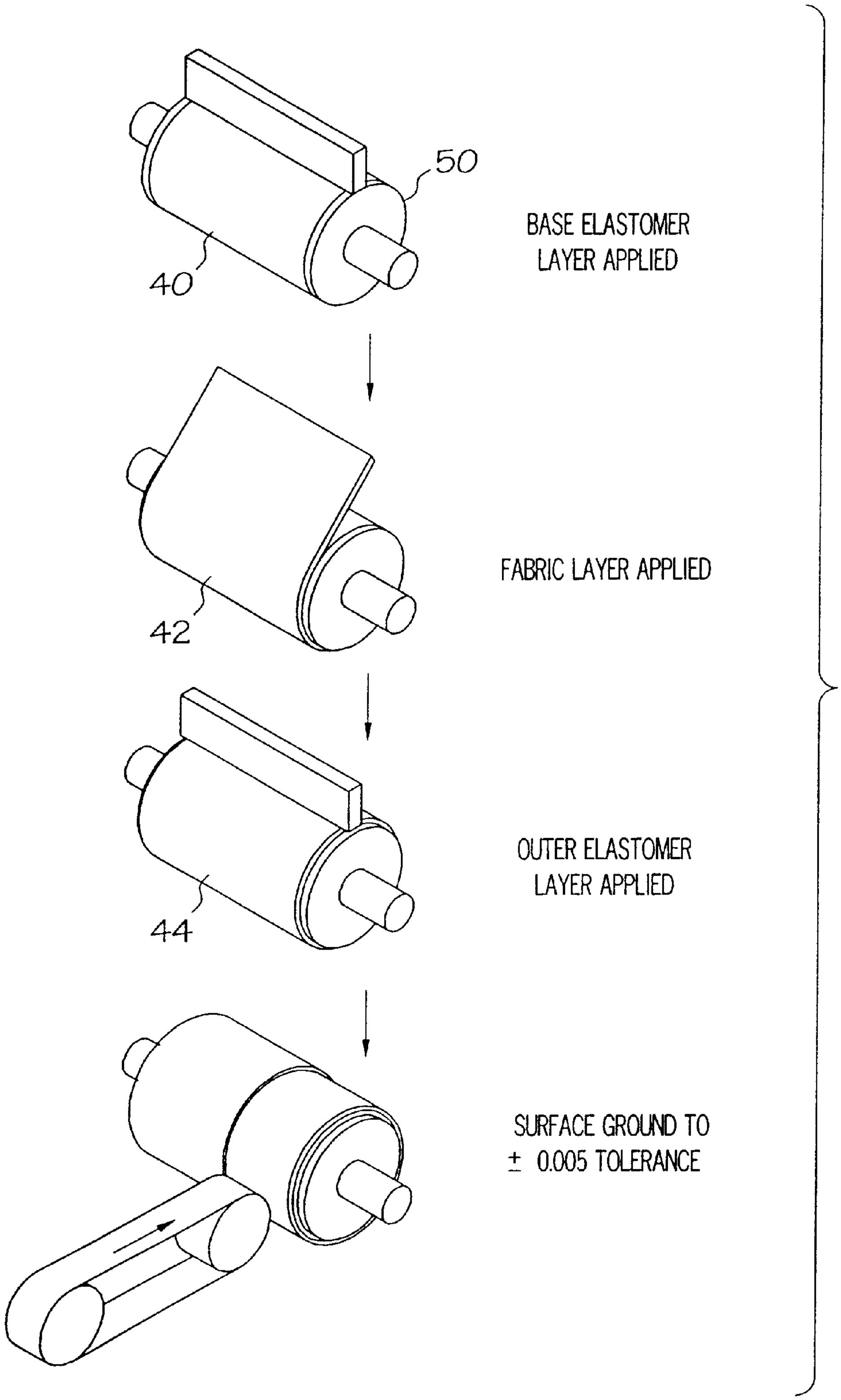
FIG. 7 is a flow diagram illustrating the steps of one method of making the belt of the present invention.

Reference is now made to FIG. 7 which is a flow diagram illustrating the steps in one method of preparing the seamless belt of the present invention. Like reference numbers in FIG. 7 represent the same elements as described in FIG. 3. It should be appreciated that the method described below is also applicable to the two-layer embodiment shown in FIG. 6.

In order to achieve precise edge to edge circumferential uniformity, a fixed and highly toleranced workpiece such as a metallic cylinder or cylindrical mandrel 50 with a polished surface is used to build the belt. An elastomer provided in a solvent solution is then applied to the mandrel, either by knife coating or roller coating to form base elastomer layer 40.

Next, the intermediate polymer layer 42 is applied over the base layer. The intermediate polymer layer is preferably etched on both surfaces prior to application over the base layer. The elastomeric surface layer 44 is then applied over the intermediate polymer layer. The outer layer is preferably knife-coated to the desired thickness over the intermediate polymer layer in the form of solvated rubber cement. Alternatively, the surface layer may be built using calendered and formable sheets of rubber that are applied directly to the polymer layer.

In embodiments which include a spun cord layer, after application of the base layer, fabric, plastic, or metal cord is dipped into a dipping tank containing a solvated elastomer (preferably solvated rubber cement) having a controlled viscosity. Preferably, the cord comprises heat resistant aramid fiber(s), but may also comprise nylon, cotton, wool or other materials, depending on the desired end use for the belt. The cylindrical mandrel is then rotated such that the dipped cord is spin-wound circumferentially left to right in the desired pattern and spacing. Singular or overlapping cord patterns may be used. After the rubber dipped cord has been spin-wound, a thin layer of rubber cement is preferably knife-coated over the circumferentially wound cord to fill the spaces between the cord.

In embodiments which further include a fabric layer, a non-woven or loosely woven fabric of very thin caliper is layered over the surface of the cord layer. Preferably, the fabric is dipped in a solvated rubber cement prior to application over the cord layer. The remaining layers are then applied as described above.

After the belt is built over the cylindrical mandrel, it is tightly wrapped in a plastic jacket (not shown) and placed under heat and pressure to cure the elastomer rubber in the layers in the belt. Upon curing, the belt is unwrapped at room temperature. The surface of the outer ply is then finished according to desired specifications such as Ra, matte or glossy in order to form a working surface. The outer layer may be finished by conventional grinding or casting methods. Preferably, the outer layer is ground to a +/−0.001 inch (0.003 cm)thickness tolerance.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An endless belt for use in a digital imaging system having first and second edges and a plurality of plies comprising:

an elastomeric base ply; an intermediate polymer ply on said base ply, and an outer elastomeric ply on said intermediate ply, said outer elastomeric ply forming a seamless working surface layer.

2. An endless belt as claimed in claim 1 in which said working surface of said outer ply is adapted to accept electrostatic charge for latent image composition.

3. An endless belt as claimed in claim 1 in which said working surface of said outer ply is adapted for intermediate image transfer.

4. An endless belt as claimed in claim 1 in which said working surface of said outer ply is adapted to transport a substrate.

5. An endless belt as claimed in claim 1 wherein the thickness of said belt varies less than 0.001 inches (0.003 cm) from said first edge to said second edge and also from one circumferential point (location) to another.

6. An endless belt as claimed in claim 1 wherein the circumferential uniformity of said belt varies less than 0.005 inches (0.013 cm) in conicity.

7. An endless belt as claimed in claim 1 in which said elastomeric base ply is selected from the group consisting of silicone, fluorosilicone, fluorocarbon, EPDM, EPM, polyurethane elastomers, and blends thereof.

8. An endless belt as claimed in claim 1 in which said outer ply is selected from the group consisting of silicone, fluorosilicone, fluorocarbon, EPDM, EPM, polyurethane elastomers, and blends thereof.

9. An endless belt as claimed in claim 1 in which said intermediate ply is selected from the group consisting of polytetrafluoroethylene, polyetherimide, polyvinylidene fluoride, and ethylene-chlorotrifluoroethylene.

10. An endless belt as claimed in claim 1 in which said outer ply is electrically insulative and has a surface resistivity of greater than about $10^{14}$ ohm/square.

11. An endless belt as claimed in claim 1 in which said outer ply is electrically conductive and has a surface resistivity of less than about $10^{14}$ ohm/square.

12. An endless belt as claimed in claim 1 further including an elastomer-impregnated spun cord layer on said base ply and a woven or non-woven fabric layer on said spun cord layer.

13. An endless belt for use in a digital imaging system having first and second edges and a plurality of plies comprising:

an elastomeric base ply; an intermediate polymer ply on said base ply, and an outer elastomeric ply on said intermediate ply said outer elastomeric ply forming a seamless working surface layer; and wherein said intermediate polymer ply has been etched on the surfaces contacting said outer ply and said base ply.

14. An endless belt for use in a digital imaging system having first and second edges and comprising:

an elastomeric base ply and an outer polymer ply on said base ply, said outer polymer ply forming a seamless working surface layer; and wherein said outer polymer ply has been etched on the surface contacting said base ply.

15. An endless belt as claimed in claim 14 in which said base ply is selected from the group consisting of silicone, fluorosilicone, fluorocarbon, EPDM, EPM, polyurethane elastomers, and blends thereof.

16. An endless belt as claimed in claim 14 in which said outer ply is selected from the group consisting of polytetrafluoroethylene, polyetherimide, polyvinylidene fluoride, and ethylene chlorotrifluoroethylene.

17. An endless belt as claimed in claim 14 further including an elastomer-impregnated spun cord layer on said base ply and a woven or non-woven fabric layer on said spun cord layer.

* * * * *

UNITED STATES PATENT AND TRADEMARK OFFICE

CERTIFICATE OF CORRECTION

PATENT NO. : 6,217,964 B1
DATED : April 17, 2001
INVENTOR(S) : Ndebi et al.

It is certified that error appears in the above-identified patent and that said Letters Patent is hereby corrected as shown below:

Column 8,
Line 10, "intermediate ply said" should be -- intermediate ply, said --

Signed and Sealed this

Sixteenth Day of October, 2001

Attest:

*Nicholas P. Godici*

NICHOLAS P. GODICI

*Attesting Officer* *Acting Director of the United States Patent and Trademark Office*